United States Patent [19]

Asakura

[11] Patent Number: 4,746,933

[45] Date of Patent: May 24, 1988

[54] THERMAL RECORD-ERASE HEAD

[75] Inventor: Osamu Asakura, Tokyo, Japan

[73] Assignee: Canon Kabushiki Kaisha, Tokyo, Japan

[21] Appl. No.: 946,956

[22] Filed: Dec. 29, 1986

[30] Foreign Application Priority Data

Dec. 28, 1985 [JP] Japan ............................... 60-297556

[51] Int. Cl.[4] .......................... G01D 15/10; B41J 3/00

[52] U.S. Cl. ............................... 346/76 PH; 400/120; 400/240.1; 400/696; 400/697.1

[58] Field of Search ................... 346/76 PH; 400/120, 400/240.1, 496, 697.1

[56] References Cited

U.S. PATENT DOCUMENTS 4,384,797 5/1983 Anderson et al. .................. 400/696
4,545,693 10/1985 Bartlett et al. ...................... 400/120
4,572,687 2/1986 Croley et al. ....................... 400/696
4,675,692 6/1987 Goshima et al. ..................... 346/1.1

FOREIGN PATENT DOCUMENTS 71934 12/1973 Japan .

*Primary Examiner*—E. A. Goldberg
*Assistant Examiner*—Gerald E. Preston
*Attorney, Agent, or Firm*—Fitzpatrick, Cella, Harper & Scinto

[57] ABSTRACT

A thermal head has heating resistors for thermal image recording and a lift-off heating resistor for ink lift-off. In image recording, both resistors are energized to maintain the ink adhesive to a recording sheet until an ink ribbon is separated from the recording sheet. In the lift-off operation, only the former resistors are energized but the latter positioned behind is deactivated, so that the ink already deposited on the sheet adheres to the ink ribbon, is cooled due to the deactivation of the latter resistor and is lifted off by the ink ribbon.

11 Claims, 5 Drawing Sheets

THERMAL RECORD-ERASE HEAD

BACKGROUND OF THE INVENTION

1. Field of the Invention

The present invention relates to a thermal head for heating an ink sheet having ink thereon for the purpose of forming a record on a recording sheet, and a thermal printer employing such thermal head.

More particularly the present invention relates to a thermal head capable not only of a recording function but also of a function of lifting off the ink deposited on the recording sheet from said sheet for the purpose of correcting an image once recorded on the recording sheet, and a thermal printer employing such thermal head.

2. Related Background Art

As a recording unit for printers, facsimiles, typewriters etc. there is widely employed a serial recording device in which a recording head, mounted on a carriage movable along a platen, scans a recording sheet or medium for forming a record thereon.

Also various recording methods are employed in practice, such as ink jet recording, wire dot recording and thermal recording, and, in thermal recording apparatus there are known a thermal transfer printer in which a thermal head is pressed against a plain paper across an ink ribbon to transfer the fused ink to said sheet, and a thermal printer in which a thermal head is pressed against and heats a heat-sensitive sheet capable of generating a color by heating, thereby forming a record by direct heating.

Furthermore, among such ink ribbons there are known a penetrating type which causes penetration of the thermally fused ink into the recording sheet, and an adhesion or non-penetrating type in which the ink is fixed to the surface of the recording sheet principally by the adhesive force of the ink in the fused state. In such adhesion type a correction can be made by lifting off the ink once deposited.

However, in the use of an ink ribbon of such adhesion type, the recording (fusion and transfer of ink) and the lift-off (fusion and peeling of ink) cannot be controlled with a conventional thermal head, but can only be achieved through the replacement of the head or a mechanical change in the peeling position of the ink ribbon.

SUMMARY OF THE INVENTION

An object of the present invention is to provide a thermal head capable of a recording operation and a correcting or lift-off operation, and a thermal printer employing such thermal head.

Another object of the present invention is to provide a thermal head capable of an easy correcting operation and a thermal printer employing such thermal head.

Still another object of the present invention is to provide a thermal head provided with a heating element for a correcting operation, and a thermal printer employing such thermal head.

DETAILED DESCRIPTION OF THE PREFERRED EMBODIMENTS

Now the present invention will be clarified in detail by embodiments shown in the attached drawings.

Figure 1:
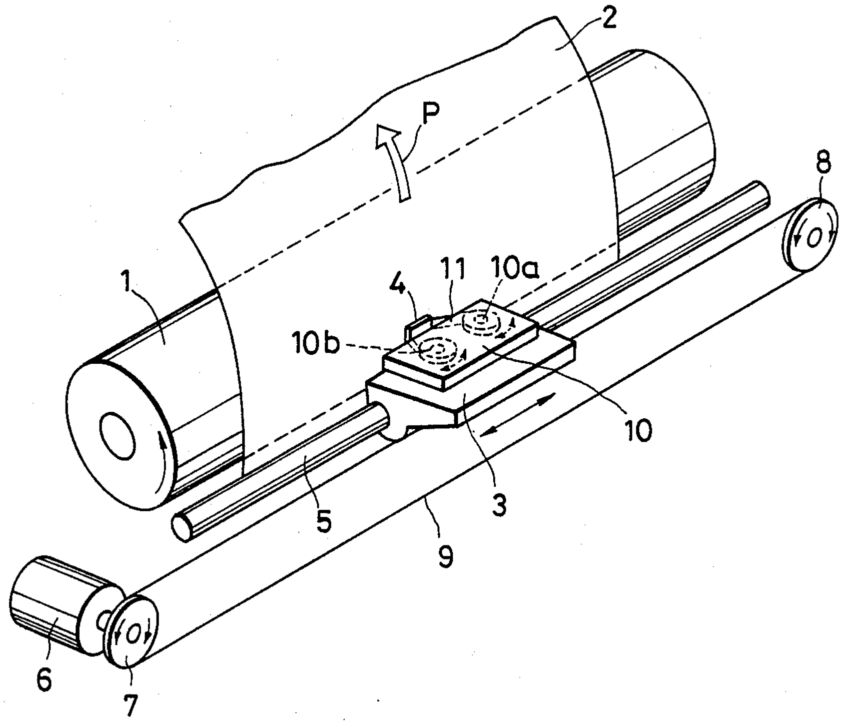
FIG. 1 is a partial perspective view of a thermal transfer recording apparatus provided with a thermal head embodying the present invention.

FIG. 1 is a schematic perspective view of a thermal transfer recording apparatus provided with a thermal head embodying the present invention. The thermal transfer recording apparatus explained in the following can be applied to electronic typewriters, word processors, image processors, facsimile apparatus etc.

In the apparatus shown in FIG. 1, a platen 1 supports a recording sheet 2, and a thermal head 4 mounted on a carriage 3 heats an ink ribbon 11 according to image information, thereby transferring the ink on said ribbon 11 onto the recording sheet 2 and forming a recording thereon. The illustrated platen 1 is formed as a roller which is driven in a direction indicated by an arrow P, by means of unrepresented driving source, and serves also as a sheet transporting roller.

The carriage 3 is rendered movable along a guide shaft 5 parallel to the platen 1, and is reciprocated along the recording sheet 2, by means of a driving system consisting of a stepping motor 6, a driving pulley 7, an idler pulley 8 and a belt 9 extended over said pulleys and connected to said carriage 3.

The thermal head 4 is provided with plural electrothermal converting elements, for example 24 heat-generating resistors arranged in a vertical array, and is so mounted as to be capable of rocking between a lowered position maintained in contact with recording sheet and an uplifted position separated from the recording sheet.

On the carriage 3 there is detachably mounted a ribbon cassette 10 for feeding the ink ribbon in front of the thermal head 4.

The ink ribbon 11 wound on a feed shaft **10*a* in the ribbon cassette 10 is driven and taken up on a winding shaft 10*b* , during the recording operation, by an unrepresented driving shaft provided on the carriage 3, in synchronization with the movement of the thermal head 4**.

Figure 2:
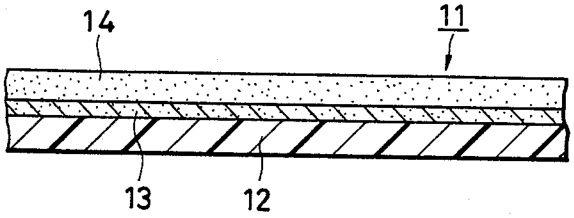
FIG. 2 is a schematic cross-sectional view of a non-penetrating ink ribbon.

Said ink ribbon 11 is provided with an adhesive (non-penetrating) and peelable ink layer, as schematically shown, as a cross sectional view, in FIG. 2.

Said non-penetrating ink ribbon 11 is provided, on a substrate film 12 composed for example of a polyester film, with an easily fusible peelable layer 13 with a low viscosity when fused, and an adhesive ink layer 14 having a high viscosity when fused and showing low penetration to the recording sheet 2.

Said peelable layer 13 is composed of a material which shows a low viscosity when fused by heating, such as wax, polyethylene or polyamide of a low molecular weight.

Said ink layer 14 is composed of a material which shows a adhesive ability upon heating such as polyethylene, polyvinyl acetate, polyacrylate resin or polyvinyl alcohol resin, in which mixed is carbon black or other dyes.

In the ink ribbon 11, the substrate film 12, peelable layer 13 and ink layer 14 may for example have thicknesses of 3.5 μm, 2 μm and 4 μm, respectively.

In the recording operation, the thermal head 4 is moved while it is pressed against the platen 1 across the ink ribbon 11 and the recording sheet 2, and plural electrothermal converting elements 16 (dot forming means) provided on the front face of said thermal head 4 perform recording by heat generation according to printing data signals. A line feed is achieved by advancing the recording sheet 2 by a predetermined pitch in a direction P.

Figure 3:
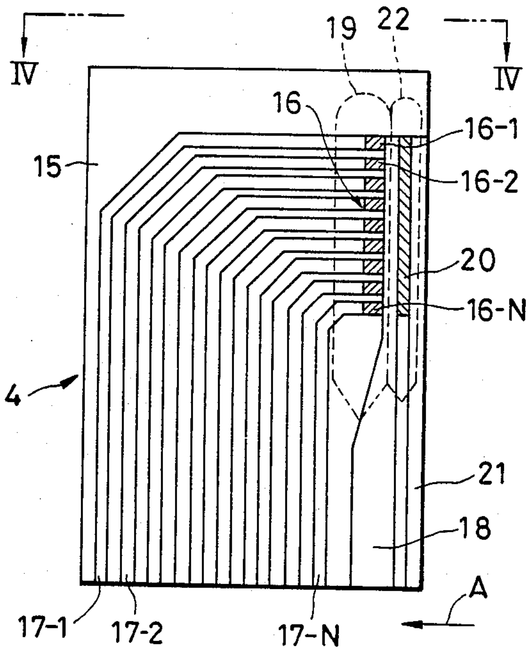
FIG. 3 is an elevation view of a thermal head embodying the present invention.
Figure 4:
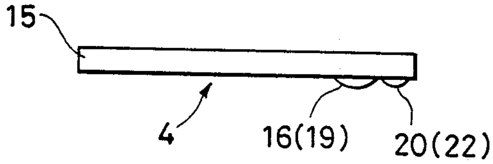
FIG. 4 is a plan view along a line IV—IV in FIG. 3.

FIG. 3 shows the front face of the thermal head 4, and FIG. 4 is a plan view seen from a line IV—IV in FIG. 3.

As shown in FIGS. 3 and 4, the thermal head 4 is provided, on a ceramic head substrate 15, with plural heat-generating resistors 16-1, 16-2, . . . , 16-N constituting dot forming means for image recording, wherein said resistors are respectively connected to electrodes 17-1, 17-2, . . . , 17-N and commonly to a common electrode 18. The heat-generating resistors 16-1, 16-2, . . . , 16-N arranged in a vertical array are formed on a glass glaze 19.

In FIG. 3, an arrow A indicates the moving direction of the thermal head 4 in the recording operation.

In the present embodiment a rod-shaped electrothermal converting element (heat-generating resistor) 20 for controlling the lift-off of the ink deposited on the recording sheet 2 is provided behind the dot forming means 16 with respect to the recording direction, on the head substrate 15.

Said heat-generating resistor 20 has a length substantially covering said dot forming means 16, and can be powered through a lift-off control electrode 21 and said common electrode 18. Also said resistor 20 is formed on glass glaze 22.

Figure 5:
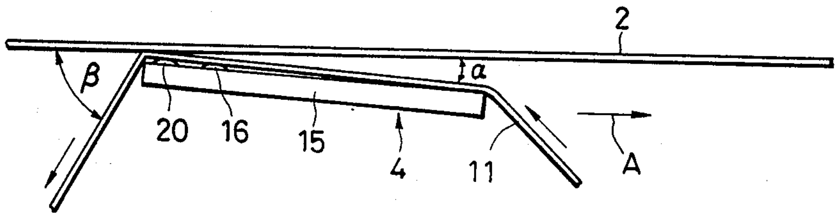
FIG. 5 is a plan view showing the mode of use of the thermal head of the present invention.

FIG. 5 shows the mode of use of said thermal head 4.

As shown in FIG. 5, the thermal head 4 is mounted with an introduction angle α with respect to the recording sheet 2 supported by the platen 1. The ink ribbon 11 is supplied from the front side in synchronization with the movement of the thermal head 4, then passes the dot forming means 16 and the lift-off control resistor 20, and leaves the sheet with a peeling angle β.

During the image recording operation, the dot forming means 16 are activated according to the printing data signals, and the lift-off control resistor 20 is energized to a low temperature not enough for recording.

On the other hand, in case of erasing a record by lifting the ink already deposited on the recording sheet 2, the lift-off control resistor 20 is turned off to a cooled state, and the dot forming means 16 is activated with a data signal coinciding with the image to be erased.

FIGS. 6A, 6B, 7A and 7B schematically illustrate the state of the ink ribbon in the image recording and in the lift-off or correction.

Figure 6A:
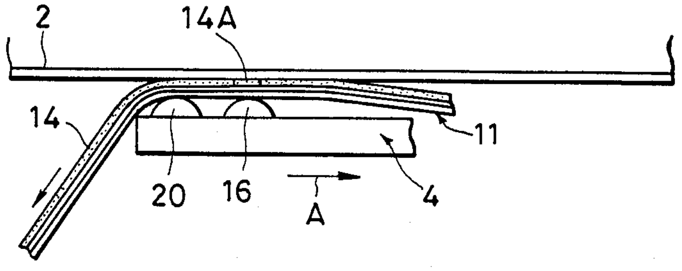
FIGS. 6A, 6B, 7A and 7B are schematic views showing the image recording operation and the lift-off operation with a thermal head embodying the present invention.
Figure 6B:
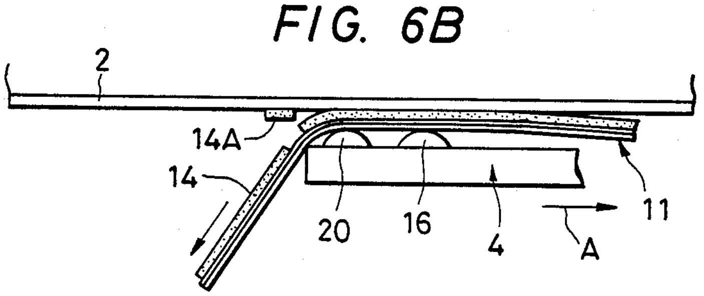

In the image recording operation shown in FIGS. 6A and 6B, wherein the lift-off control resistor 20 is turned on, an ink dot 14A heated by the dot forming means 16 in a position shown in FIG. 6A is maintained at a highly viscous state until the moment of ribbon separation shown in FIG. 6B, whereby the ink dot is transferred onto the recording sheet 2 as illustrated.

Figure 7A:
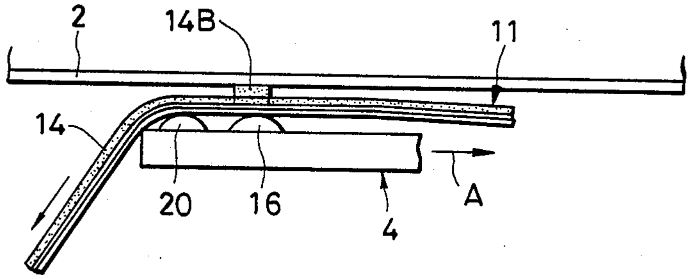
Figure 7B:
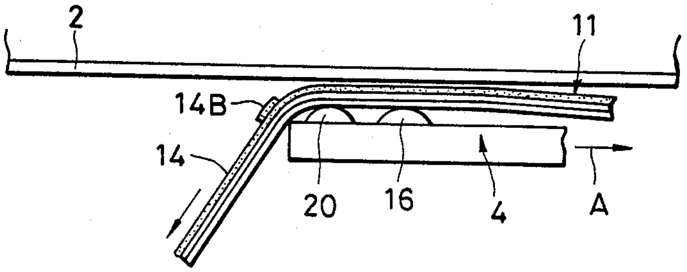

On the other hand, in the lift-off operation shown in FIGS. 7A and 7B, the position of an ink dot 14B on the recording sheet 2 is heated through the ink ribbon 11 by the dot forming means 16, as shown in FIG. 7A.

However, since the lift-off control resistor 20 is turned off in this case, the ink dot 14B heated in the position shown in FIG. 7A and adhered to the ink layer 14 of the ink ribbon 11 is cooled before the ink ribbon is separated from the sheet as shown in FIG. 7B. Thus the interface of the ink dot 14B and the ink ribbon 11 solidifies in the adhered state, so that the ink dot 14B is peeled from the recording sheet 2 and is transferred to the ink ribbon 11.

In this manner a same thermal head 4 can achieve image recording and lift-off of a recorded image in an easy and exact manner, simply by turning on or off the lift-off control resistor 20.

Also the thermal head of the present embodiment can achieve the lift-off function in an extremely compact structure, since the image recording resistors 16 and the lift-off control resistor 20 are formed on a common head substrate 15.

Figure 8:
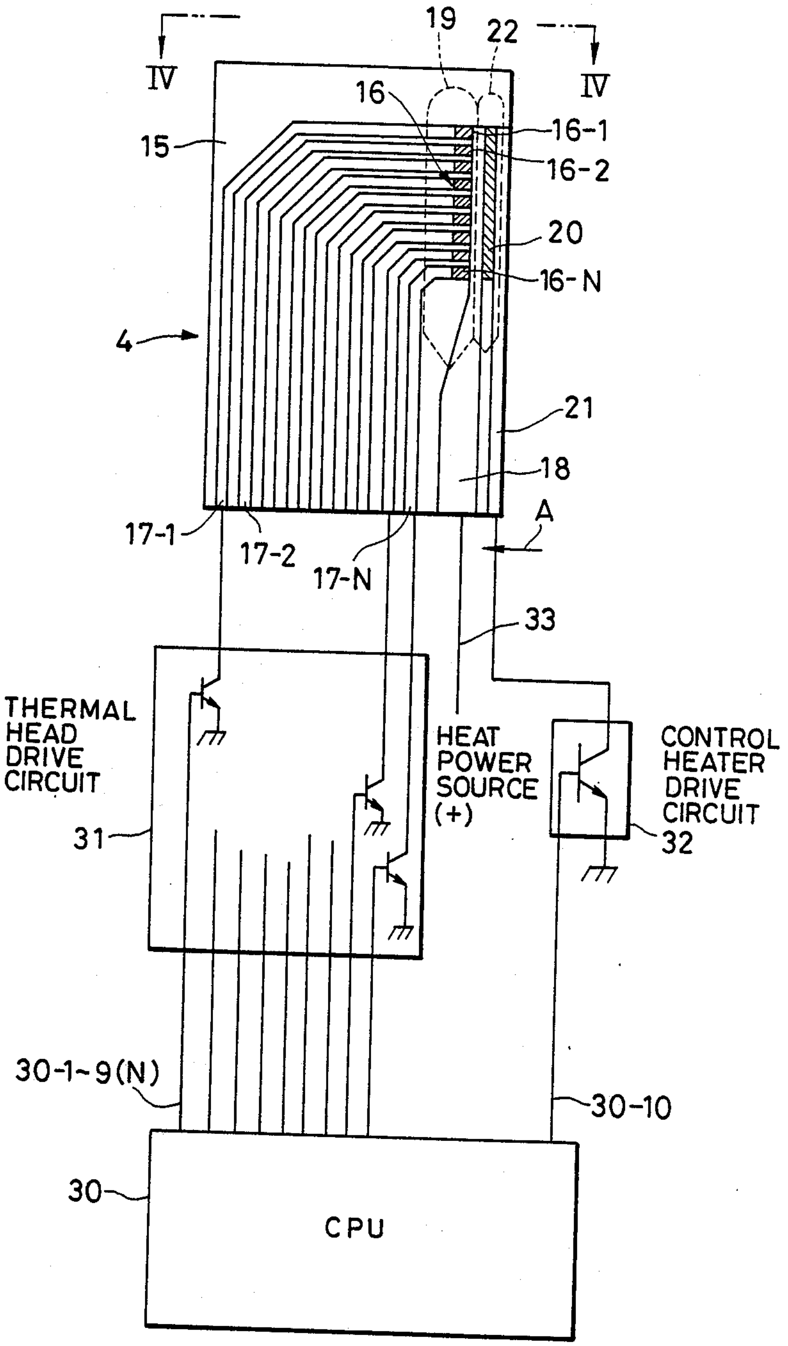
FIG. 8 is a block diagram of a driving device for the thermal head of the foregoing embodiment.

FIG. 8 shows a device for driving the thermal head of the present embodiment, wherein provided is a CPU 30 for supplying heat-generating signals, in response to recording data, to a thermal head driving circuit 31 and a control resistor driving circuit 32. Said CPU performs on-off control of said recording resistors 16-1 - 16-N and said control resistor 20.

Said thermal head driving circuit 31 is connected to the respective electrodes 17-1 - 17-N of the thermal head 4, and supplies an electric current to desired heating resistors 16-1 - 16-N from a heating power source 33 in response to a recording or correction signal from CPU 30, thus generating heat in said resistors and achieving image recording or correction.

The control resistor driving circuit 32, in response to a signal from the CPU 30 corresponding to recording data, activates the resistor 20 in the recording operation to elevate the temperature of the ribbon at the separation thereof from the recording sheet 2. However, in the correction operation, the circuit does not energize the resistor 20 to maintain the ribbon at a sufficiently low temperature at the separation. For example, in case of making a correction, the carriage 3 is moved to the position of correction, and a correction key (not shown) is depressed, whereby a signal from the CPU 30, stored in an unrepresented memory, activates the heating resistors 16 alone to lift off the erroneously recorded ink.

Figure 9A:
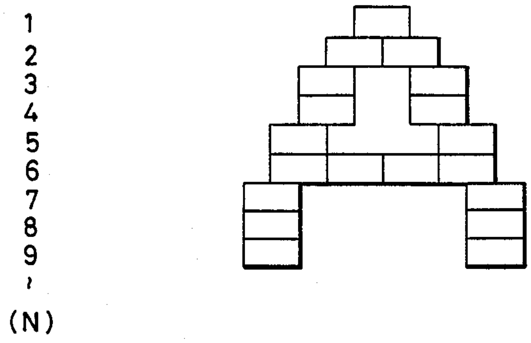
FIGS. 9A, 9B and 9C are timing charts showing the recording operation.
Figure 9B:
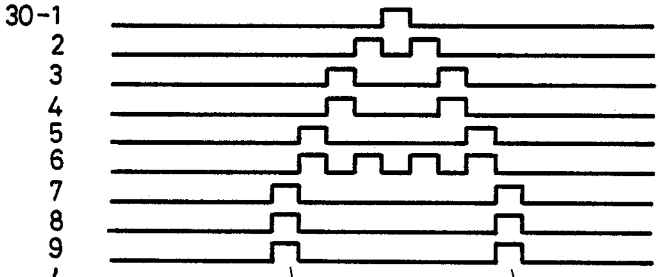
Figure 9C:
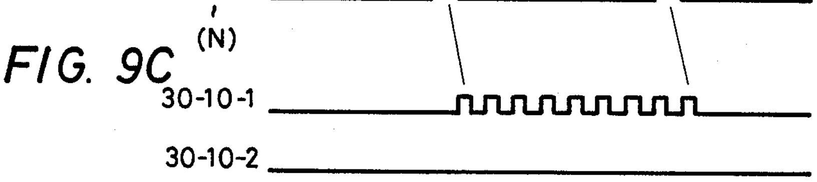

Now reference is made to FIGS. 9A to 9C for further explaining the details of the recording operation. FIG. 9A shows a recording pattern "A" as an example, while FIG. 9B shows thermal head driving signals 30-1 - 30-9 of the CPU 30 in recording said pattern "A". Also FIG. 9C shows the control output signal of the CPU 30 to the control resistor driving circuit 32, wherein 30-10-1 is a control output signal in case of the recording operation, while 30-10-2 is a control output signal in case of the lift-off operation with no current supply to the control resistor 20.

In a recording operation, in response to a recording signal in any of 30-1 to 30-N, a control output signal 30-10-1 is released simultaneously or with a slight delay.

Such delay is given because there is a little time required for the ribbon 11 heated for recording to teach the position of the control resistor 20.

On the other hand, in a lift-off operation, the output signals 30-1 - 30-N are supplied to the thermal head driving circuit 31 in the same manner as in the recording operation, in such a manner as to generate the heating signals in a pattern "A", overlapping the already recorded pattern "A", but the control resistor signal is not generated as shown in 30-10-2.

Figure 10A:
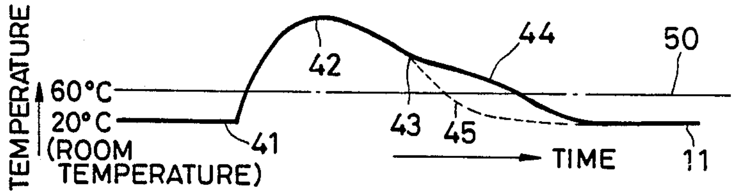
FIGS. 10A and 10B are schematic views showing relative positional relationship of an ink ribbon and a thermal head.
Figure 10B:
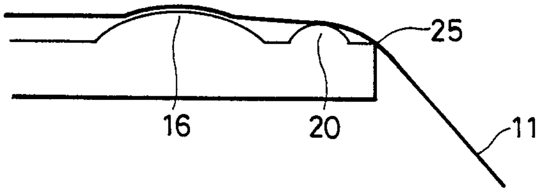

FIG. 10A shows the change of temperature in time at a point on the ribbon 11 in the recording and lift-off operations, and FIG. 10B shows the position of said point of the ribbon 11 on the thermal head.

Let us consider a certain point on the ink ribbon 11 utilized for recording.

When said certain point faces the recording resistor 16 of the thermal head 4, said thermal head is energized to heat the ink ribbon 11 to a temperature over 100° C. to several hundred degrees (position 41). When said point reaches about the middle of the resistor 16 (position 42), the heating is completed whereby the temperature of the ribbon 11 starts to decline. When said point reaches the position of the control resistor 20 (position 43) which is heated for example to ca. 50° C., in case of a recording operation, the decline in temperature is reduced. Thus, when the ribbon reaches a head edge portion 25 (position 44) where the ribbon is separated, the temperature of the ribbon in the present embodiment is ca. 90° C., which is higher than the recording temperature level, which is ca. 60° C. in the present embodiment.

In the lift-off operation, in which the control resistor 20 is not activated, the temperature of the ribbon is ca. 25° C., lower than said recording temperature, when the ribbon 11 is separated from the sheet at the edge portion 25 (position 45), and the lift-off operation is thus enabled.

As explained in the foregoing, the present invention provides a thermal head capable of an image recording operation and a lift-off operation in easy and exact manner with a simple structure, and a thermal printer utilizing said thermal head.

I claim:

1. A thermal head adapted for use in thermal printing utilizing an ink sheet carrying ink thereon for image recording on a recording sheet, comprising:

a substrate;

recording heat-generating members provided on said substrate for image recording on said recording sheet by transferring the ink of said ink sheet to said recording sheet; and a lift-off heat-generating member provided on said substrate at the rear side of said recording heat-generating members with respect to the recording direction, for lifting off the ink, which has been transferred from said ink sheet to said recording sheet by the heat generated by said recording heat-generating members, from said recording sheet.

2. A thermal head according to claim 1, wherein said ink sheet comprises a non-penetrating peelable ink layer.

3. A thermal head according to claim 1, wherein said thermal head is capable of a reciprocating motion along said recording sheet.

4. A thermal head according in claim 1, wherein said recording heat-generating members and said lift-off heat-generating member are energized in the image recording, while said lift-off heat-generating member is deactivated in case of lifting off the ink which has been transferred to said recording sheet.

5. A thermal head according to claim 1, wherein said recording heat-generating members and lift-off heat-generating member are provided on the same circuit board.

6. A thermal printer utilizing an ink sheet carrying ink thereon for image recording on a recording sheet, comprising:

a thermal head comprising:

a substrate;

recording heat-generating members provided on said substrate for image recording on said recording sheet by transferring the ink of said ink sheet to said recording sheet; and a lift-off heat-generating member provided on said substrate at the rear side of said recording heat-generating members with respect to the recording direction, for lifting off the ink, which has been transferred from said ink sheet to said recording sheet by the heat generated by said recording heat-generating members, from said recording sheet;

transport means for transporting said recording sheet; and control means for on-off control of said recording heat-generating members and said lift-off heat-generating member.

7. A thermal printer according to claim 6, wherein said ink sheet comprises a non-penetrating peelable ink layer.

8. A thermal printer according to claim 6, wherein said transport means comprises a platen roller.

9. A thermal printer according to claim 2, wherein said thermal head is capable of a reciprocating motion along said recording sheet.

10. A thermal printer according to claim 6, wherein said recording heat-generating members and said lift-off heat-generating member are energized in the image recording, while said lift-off heat-generating member is deactivated in case of lifting off the ink which has been transferred to said recording sheet.

11. A thermal printer according to claim 6, wherein said recording heat-generating members and said lift-off heat-generating member are provided on the same circuit board.

* * * * *

UNITED STATES PATENT AND TRADEMARK OFFICE

CERTIFICATE OF CORRECTION

PATENT NO. : 4,746,933

Page 1 of 2

DATED : May 24, 1988

INVENTOR(S) : OSAMU ASAKURA

It is certified that error appears in the above-identified patent and that said Letters Patent is hereby corrected as shown below:

COLUMN 2

Line 35, "of unrepresented" should read --of an unrepresented--.
Line 47, "with recording" should read --with the recording--.

COLUMN 3

Line 6, "a" should read --an--.
Line 8, "mixed is" should read --is mixed--.

COLUMN 5

Line 2, "teach" should read --reach--.
Line 36, "25° C.," should read --25° C.--.

UNITED STATES PATENT AND TRADEMARK OFFICE

CERTIFICATE OF CORRECTION

PATENT NO. : 4,746,933 Page 2 of 2

DATED : May 24, 1988

INVENTOR(S) : OSAMU ASAKURA

It is certified that error appears in the above-identified patent and that said Letters Patent is hereby corrected as shown below:

COLUMN 6

Line 16, "and lift-off" should read --and said lift-off--.
Line 46, "claim 2," should read --claim 6,--.

Signed and Sealed this

Twenty-seventh Day of December, 1988

Attest:

DONALD J. QUIGG

Attesting Officer

Commissioner of Patents and Trademarks